Oct. 31, 1961   B. H. C. HAMBLETON   3,006,564
COIL WINDING APPARATUS

Filed Jan. 29, 1957   5 Sheets-Sheet 1

Fig. 1

INVENTOR.
BERTRAM H.C. HAMBLETON, DEC.
BEATRICE H.V. HAMBLETON,
EXECUTRIX
BY Oberlin & Limbach
ATTORNEYS.

Oct. 31, 1961  B. H. C. HAMBLETON  3,006,564
COIL WINDING APPARATUS
Filed Jan. 29, 1957  5 Sheets-Sheet 2
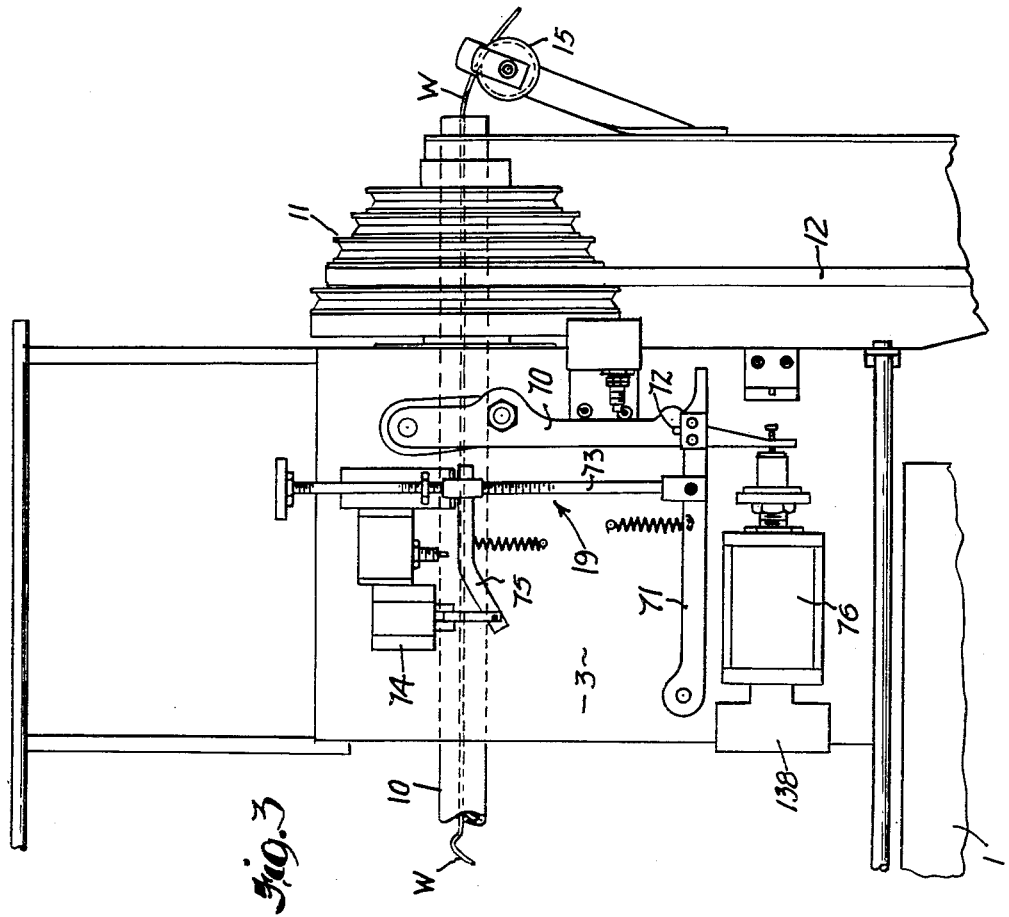
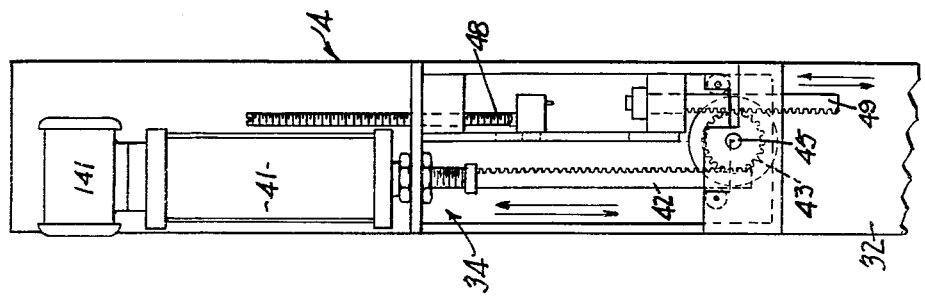
INVENTOR.
BERTRAM H. C. HAMBLETON, Dec.
BY BEATRICE H. V. HAMBLETON,
EXECUTRIX
BY Oberlin + Limbach
ATTORNEYS.

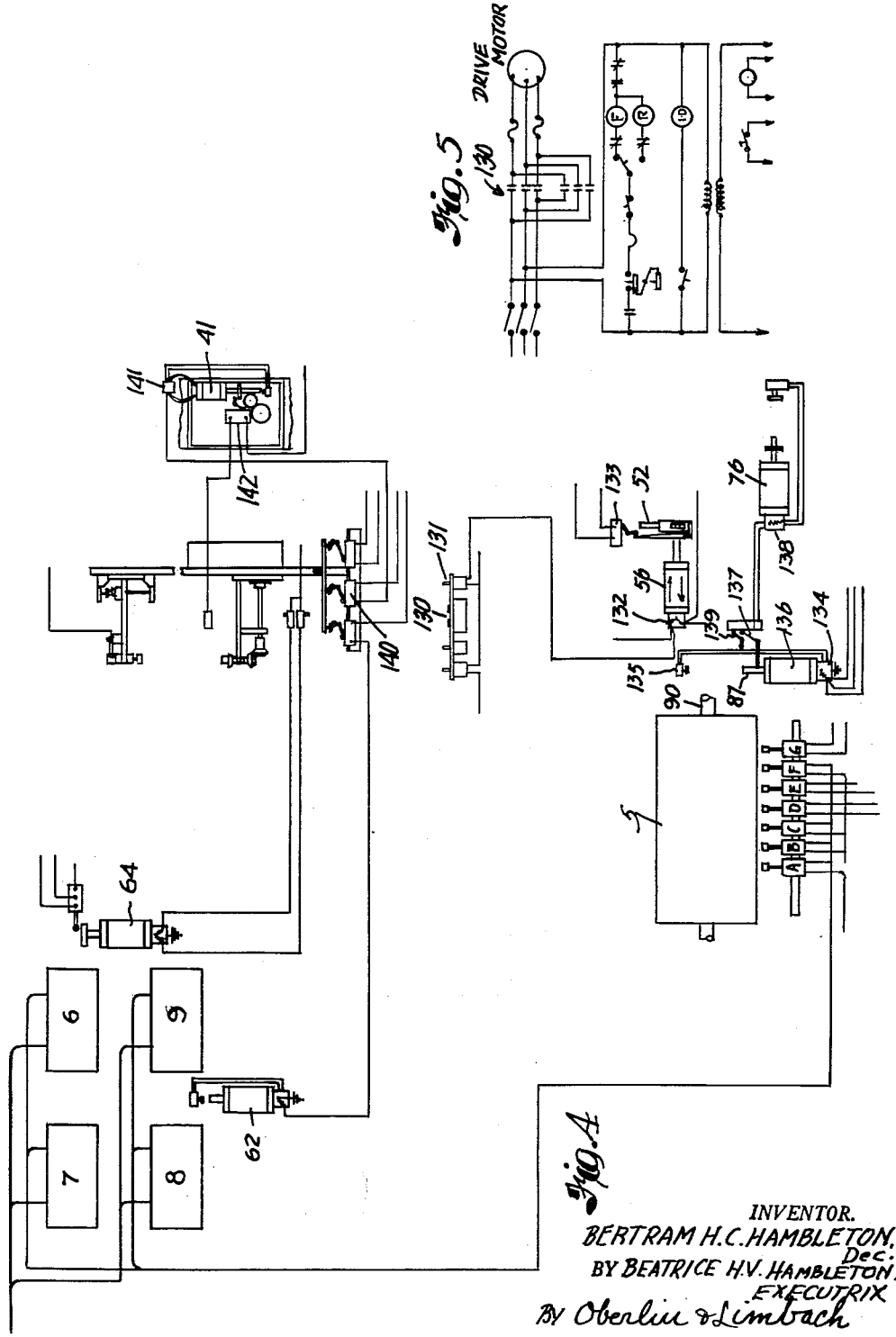

Oct. 31, 1961

B. H. C. HAMBLETON 3,006,564

COIL WINDING APPARATUS

Filed Jan. 29, 1957

INVENTOR.
BERTRAM H.C. HAMBLETON, Dec.
BY BEATRICE H.Y. HAMBLETON,
EXECUTRIX
BY Oberlin + Limbach
ATTORNEYS.

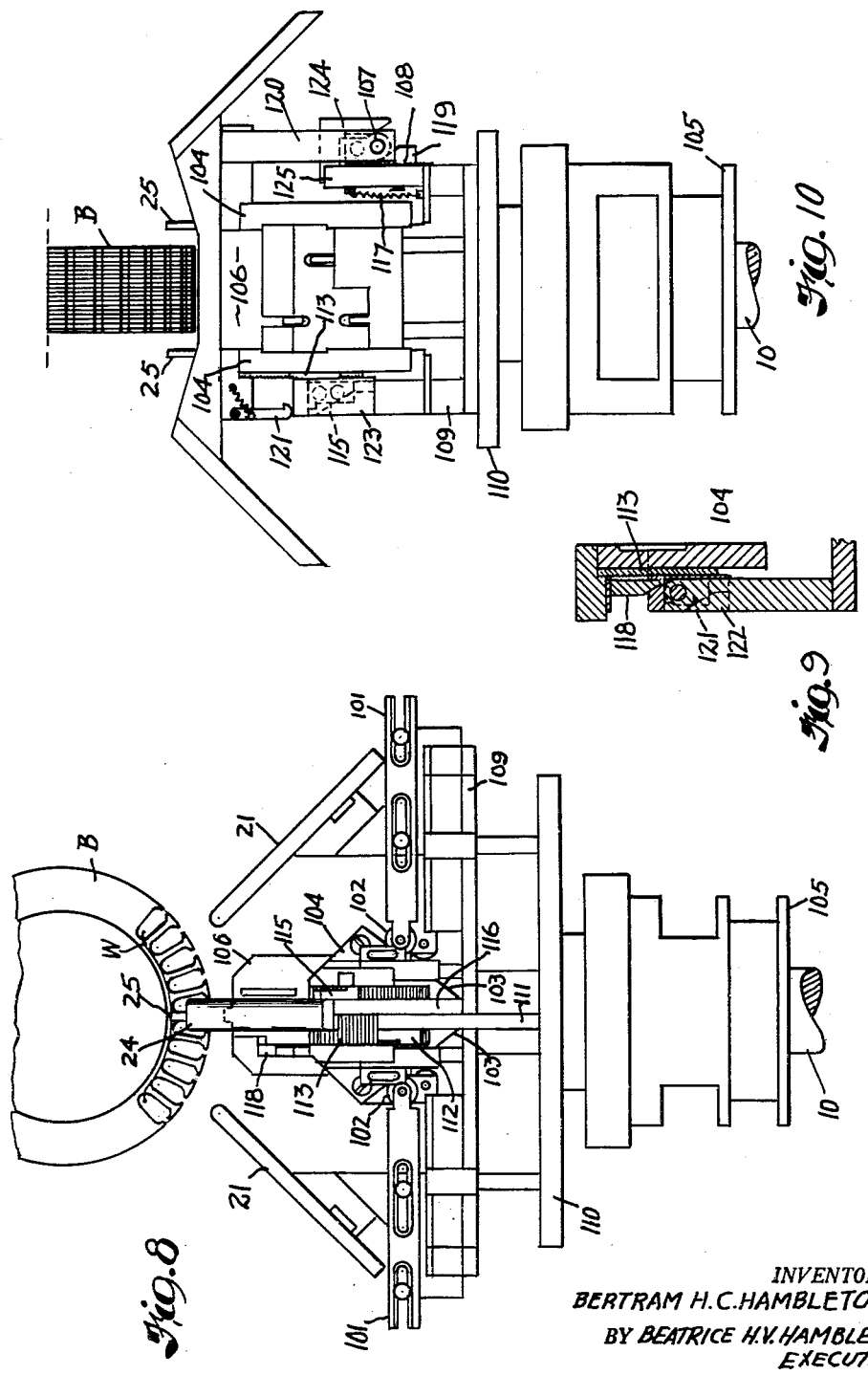

United States Patent Office 3,006,564
Patented Oct. 31, 1961

3,006,564
COIL WINDING APPARATUS
Bertram H. C. Hambleton, deceased, late of Maple Heights, Ohio, by Beatrice H. V. Hambleton, executrix, Maple Heights, Ohio, assignor to Vincent K. Smith, doing business as Electric Motor Development Co., Wickliffe, Ohio
Filed Jan. 29, 1957, Ser. No. 636,959
6 Claims. (Cl. 242—13)

The present invention relates generally as indicated to a coil winding apparatus and more particularly to apparatus for winding wire coils in the slots of the laminated stator or rotor of a dynamo electric machine.

Insofar as stators and winding of coils therein are concerned, reference may be made to the Patent No. 2,565,530 issued to Vincent K. Smith under date of August 28, 1951, said patent disclosing a composite stator structure wherein an annular component (or so-called "spider") first has wire coils wound into the external axial slots thereof and then said wound inner component is fitted within a heat-expanded outer annular component, both of said components preferably comprising stacks of sheet metal stampings or laminations. Numerous advantages flow from this type of stator construction, for example, there is less windage loss and no harmonic noises because of the smooth inner bore of the assembly; a smaller air gap is possible also because of the smooth bore; the flux path is modified to result in a quieter motor; the wire may be better packed in exterior slots than in interior slots as in conventional stators whereby the coils may have a greater number of turns for a prescribed size of stator thus resulting in improved performance; the smooth, uninterrupted bore results in even flux distribution in the air gap for improved performance; the packing of a prescribed number of turns in smaller slots permits increased tooth width to contribute to improved performance as a result of better flux paths; and the coils may be wound with shorter end loops and thus less copper and lower $I^2R$ loss.

However, this invention is not restricted to the winding of such inner annular stator components but may be employed for winding of coils in slotted armature or rotor bodies, for example.

It is a principal object of this invention to provide an automatic coil winding apparatus in which a lightweight winding element revolves about the stationary slotted body, thus enabling rapid starting and accurate, instantaneous stopping of the movement of such element. This is in contrast to ordinary coil winding machines of the "spinner" type in which the slotted body and wire guides are rapidly rotated with respect to a wire feed arm whereby large inertia forces are encountered during rapid starting and stopping of the rotation of said body and wire guide. Herein the slotted body and wire guide are stationary and only the lightweight winding element is alternately started and stopped without necessity of heavy duty braking equipment or without excessive coasting.

It is another object of this invention to provide a universal and automatic winding head for a coil winding apparatus that is characterized by its adjustability to accommodate different sizes and slot spacings of the slotted bodies to be wound.

Another object of this invention is to provide a coil winding apparatus that may be set up to wind several coils successively and automatically.

Another object of this invention is to provide a coil winding apparatus that is simple in structure while yet efficient in operation.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings;

FIG. 1 is a side elevation view of a preferred embodiment of this invention;

FIG. 2 is an end elevation view, on somewhat enlarged scale, as viewed from the upper right hand side of FIG. 1;

FIG. 3 is a rear elevation view as viewed from the rear side of the head stock, said head stock being located at the left hand side of FIG. 1;

FIGS. 4 and 5 are schematic wiring diagrams by which automatic sequencial operation of the coil winding apparatus is effected;

FIG. 8 is a top plan view showing the winding head in a different position with the wire guide wings retracted and spread apart preparatory to the winding of a coil in a different pair of slots;

FIG. 9 is a fragmentary cross-section view taken along line 9—9, FIG. 6; and

FIG. 10 is a view from the right hand side of FIG. 6 with the wire guide wings removed.

Figure 7:
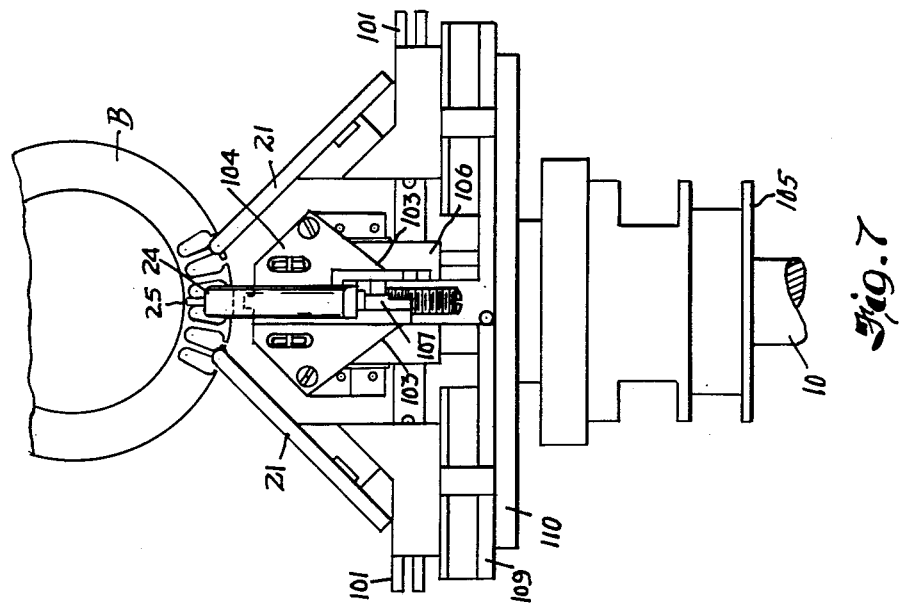
FIGS. 6 and 7 are top and bottom plan views respectively showing the universal winding head in operating position for winding a coil in one pair of slots spanned by the wire guide wings.

*Winding apparatus as a whole (FIGS. 1 to 3)*

In the example of the coil winding apparatus herein disclosed, there is provided a base 1 which mounts an electric drive motor (not shown), as on a platform between the legs 2 at the left end of said base, and which includes a head stock 3 and a tail stock 4, the latter being adapted to mount thereon the externally slotted body B in which wire coils are to be wound. Hung from the base 1 is a program drum 5 that controls the automatic sequential operation of the apparatus responsive to the counters 6, 7, 8, and 9 mounted on the front side of the head stock 3 that are activated when the successively wound coils have a predetermined number of turns.

Journaled in the head stock 3 is a drive shaft 10 that is driven by the variable speed pulley 11 as by means of a belt 12 trained over a similar pulley on the electric drive motor, said drive shaft 10 carrying an adjustable flyer or winding arm 14 and having threaded therethrough the wire W which is to be wound into coils on said body. The wire W passes into shaft 10 over a pulley 15 mounted adjacent the left end of said drive shaft 10 and then passes over suitable pulleys 16 mounted in the shaft 10 itself where the wire W passes from within said shaft to said arm and on the arm 14. It is to be noted that said flyer arm 14 at its terminal end, comprises separate links 17 and 18 that are bolted for ready adjustment radially inward and outward and/or axially back and forth in accordance with the physical size of the slotted body B. The flyer arm 14 has two terminal ends, as shown, for balance and also for winding two wires into coils at the same time, if desired.

As best shown in FIG. 3, the rear side of the head stock 3 is provided with a brake and clutch actuating mechanism 19, said mechanism as hereinafter described, being effective when actuated to set the brake to arrest rotation of the flyer arm 14 and drive shaft 10 while a clutch is disengaged to permit the drive pulley 11, and electric drive motor to continue to rotate, whereby said brake need only overcome the inertia of the relatively light weight drive shaft and flyer arm mounted thereon.

The reference numeral 20 denotes the universal winding head which is shown and described in detail with reference to FIGS. 6 et. seq. but for the present purpose, it suffices to state merely that said winding head 20 comprises opposite converging wire guide wings 21, the leading edges 23 of which are spaced apart and dimensioned to register with the edges of the pair of slots of body B in which it is desired to wind a wire coil. Said wings 21 have upper and lower edge portions as viewed in FIG. 1 that are curved toward each other whereby as the flyer arm 14 revolves thereabout, the wire W that contacts the sides, top, and bottom of said guide wings 21 slides axially therealong into the pair of slots of the body B spanned by edges 23. As will be seen more clearly in FIG. 8, the wire sliding into the pair of slots will be pulled across the ends of the body from one slot to the other and primarily against the sides of the slots. Said winding head 20 also carries a center piece or compacter 24 between the top and bottom edge portions of wings 21, said compacter being provided with pins 25 or the like, that fit into holes formed in the body holder pieces 26, whereby as a coil is being wound, the end loops will be sufficiently long to permit the usual reshaping of the coil ends.

As hereinafter described, the present apparatus is designed to wind single phase stators having so-called "concentric windings," that is, coils wound in several pairs of slots, usually three, and constituting each pole of the stator. In winding such coils, the span of slots of the first coil is relatively short whereby if, as the flyer arm 14 rotates, the wire is pulled directly across from one slot to the other it is not effectively drawn down toward the bottoms of the slots with the result that fewer than the desired number of turns can be wound in the slots of the first coil. To increase the tendency of pulling the wire down to the bottoms of the slots of the short span coils, there is provided the wire compacter 24 which, as evident from FIG. 1, is operative to cause the wire to slide toward the center of the slotted body B as the flyer arm 14 passes over the top and bottom of said body B. The pins 25 of the compacter 24 serve to lengthen the coils so that the coil ends may be shaped as desired after the wound body B is removed from the machine and the heads 26 are pulled away from clamping position.

The frusto-conical clamping heads 26 have a guiding function also in that in winding the third coil, for example, which is wound in a pair of slots having a long span, the wire slides outwardly along the conical surfaces of said heads 26 so as to shape the coil ends to approximately final curved shape. Without the frusto-conical heads 26 the coil ends would extend chordally across the ends of the slotted body B without leaving sufficient wire for shaping to clear the rotor. The pins 25 of the compacter 24 also serve to provide the extra length of the wire at the coil ends to enable proper shaping.

Having thus generally described the winding apparatus, reference will now be made in detail to the various subassemblies thereof under the following sub-headings:

Tail Stock and Actuating Mechanism Therefor;
Coil Turns Counters;
Brake and Clutch Actuating Mechanism;
Program Drum;
Universal Winding Head; and
Operation

*Tail stock and actuating mechanism therefor (FIGS. 1 and 2)*

As aforesaid, the slotted body B, into paired series of slots wire coils are desired to be wound, comprises a stack of laminations that is clamped between opposite, frusto-conical heads 26 which also serve to guide the wire W into the selected pair of slots in conjunction with the wings 21 and compacter 24 as the flyer arm 14 rotates about the axis of the drive shaft 10. The tail stock 4 as here shown, comprises a roller equipped base plate 30 which is longitudinally movable in a guide 31 mounted on the base 1. The upright portion 32 of said tail stock vertically adjustably carries the clamping and indexing mechanism 34 for the body B which is held between horizontal arms 35 and 36 that are equipped with end pieces 37 and 38 provided with bosses extending into recesses formed in the respective heads 26. As can be seen, vertical adjustment of the entire assembly 34 is required to position the medial horizontal plane of the laminated body B at the central axis of the drive shaft 10 and winding head 20 to accommodate different heights of lamination stacks. Having made the vertical adjustment of the clamping and indexing mechanism 34 provision is made for vertical movement of the upper arm 35 with respect to the lower arm 36 for loading and unloading of unwound and wound bodies B from the apparatus. A suitable linkage is provided for this purpose and herein comprises a pivoted lever 39 which raises and lowers said arm 35 and end piece 37 along the vertical guide rod 40.

Said vertically adjustable assembly 34 has mounted thereon an air cylinder 41, the piston rod of which is in the form of, or has attached thereto, a gear rack 42 meshing with a spur gear 43 on shaft 45 that has mounted on its left end a bevel gear 46 in mesh with a bevel gear 47 on the bottom end piece 38 whereby the body B held by pieces 37 and 38 of arms 35 and 36 may be indexed for winding a coil in another pair of slots of said body B. The degree of such indexing may be determined as by means of the adjustable stop screw 48 which is engaged by the end of another gear rack 49 meshing with the gear 43 aforesaid. As evident, particularly from FIG. 2, when the gear rack 42 is moved downwardly, the other gear rack 49 is moved upwardly until the upper end thereof abuts the lower end of said screw 48. This accurately determines the angle of the indexing, which for some stators will be 180° when the starting windings and main windings are wound in diametrically opposed pairs of slots.

Said assembly 34 also carries another air cylinder 50 for actuating a locking pawl into engagement with the toothed wheel 51 so as to lock the mechanism in its indexed position.

The movement of the tail stock 4 together with the body B held thereby toward and away from the winding head 20 is effected through a lever 52, fulcrumed at 53, and having its upper end linked to an adjusting screw 54 and its lower end linked to the piston rod of an air cylinder 56.

As evident, when the piston rod in the air cylinder 56 is moved to the right, the tail stock 4 will be shifted toward winding head 20 to a predetermined position as determined by the adjusting screw 54 and conversely, when the piston in said air cylinder 56 is moved to the left, the tail stock 4 will be retracted away from the winding head 20.

*Coil turns counters (FIG. 1)*

As shown in FIG. 1, there are four counters 6, 7, 8, and 9, the top pair 6 and 7 of which are coupled together and driven as by means of a chain drive 63 from the main drive shaft 10 and the bottom pair 8 and 9 of which are likewise coupled together and driven from the top pair as by means of another chain drive 61. Associated with said counters 6, 7, 8, and 9 is an air cylinder 62 which resets the counters 6, 7, 8, and 9. In any event, the counters operate successively to discontinue the winding operations when successive coils have the desired number of turns.

The counter drive 63 from the drive shaft 10 is reversed as by an air cylinder 64, the piston rod of which, when raised, reverses the drive gearing mechanism 60 so that the counters 6, 7, 8, and 9 are operated in the same direction, regardless of the direction of rotation of flyer arm 14, which changes direction for each successive pole.

Brake and clutch actuating mechanism (FIG. 3)

The brake and clutch are disposed inside the head stock 3 and have not been illustrated in detail herein, since any conventional form thereof may be employed. In FIG. 3, the reference numeral 70 denotes the brake setting-clutch disengaging lever which is controlled by a trigger 71, the key 72 of which disengages from lever 70 when rod 73 is moved down either manually or by solenoid 74 and link 75, whereupon the piston rod of air cylinder 76 flicks lever 70 in a counterclockwise direction to promptly set the brake and release the clutch. Such actuation of lever 70 instantly stops shaft 10 and flyer arm 14 and permits pulley 11 and the drive motor to run freely.

Program drum (FIG. 1)

The program drum 5 is rotatably mounted in hangers 80 depending from the bed of base 1 and has a plurality of axially extending slots 81 in its periphery on which switch actuating blocks 82 are adapted to be mounted, and, in addition, said drum 5 carries a cam 83 for actuating the pivoted lever 84, said cam 83 herein being in the form of a pair of link chains 85 which may be readily adjusted axially to change the shape of the cam groove defined therebetween. The drum 5 is periodically indexed by an air cylinder 136 (see FIG. 4), the piston rod 87 of which is in the form of a gear rack meshing with the spur gear 89 affixed on the drum shaft 90. Adjacent said gear 89, is a ratchet mechanism 91 to effect incremental advance of said drum 5 each time that the piston rod 87 moves in a specified direction.

Adjacent to the periphery of drum 5 and parallel to the drum axis is a platform 92 on which are mounted switches A to G which are adapted to be actuated by blocks 82 on said drum.

Universal winding head (FIGS. 6 to 10)

Basically, all that is required to achieve the main function of the winding head 20 is the provision of converging plates or wings 21 that form a more or less conical surface along which the wire W under tension slides axially into the pair of slots of body B spanned by the leading vertical and parallel edges 23 of said wing. In such case, different plates and mountings therefor would be required for each different size of body B and for each different spacing of slots in which a wire coil is to be wound.

In the present case, the winding head 20 is universal and has a unique automatic operation as now to be described.

In the universal winding head 20 herein disclosed, the wings 21 each are in two parts adjustably mounted on cam actuated carriages 101 to correspond to the stack height of the body B, the cam follower here being a roller 102 on each carriage engaged with a beveled surface 103 of an axially movable cam 104 whereby the wings 21 may be adjustably spaced laterally apart at their parallel leading edges 23 a distance corresponding to the distance between the edges of the pair of slots in body B in which a wire coil is to be wound. Said cam 104 is actuated through the yoke 105 and program drum actuated lever 84. Thus, in one position of said wings 21, a coil may be wound in one pair of slots on one side of the body B whereafter the wings 21 may be spread apart by cam 104 to wind another coil in another pair of slots. Thereafter, the body B may be indexed, say 180°, and coils similarly wound in two pairs of slots thereof by successive manipulation of the winding head 20 to actuate the wings 21 to different positions with respect to each other.

Figure 6:
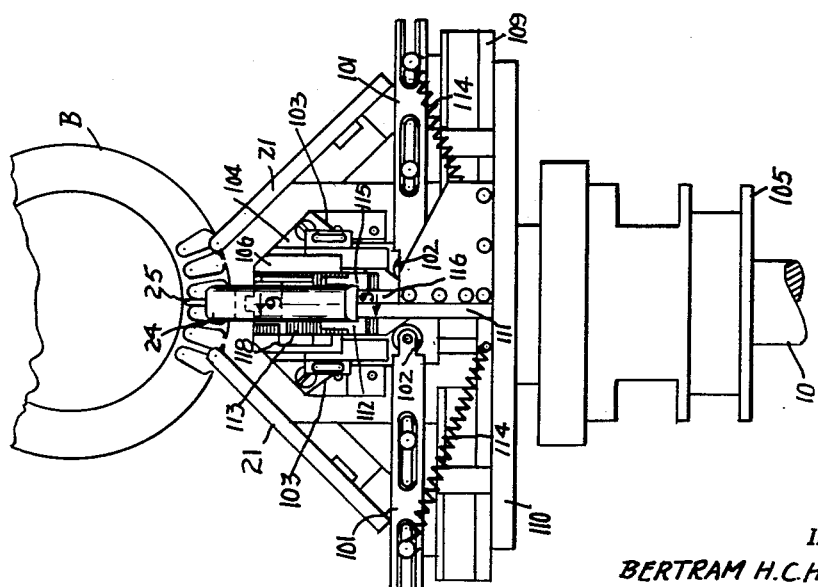

In one specific example, the actuator yoke 105 is first moved downwardly as viewed in FIGS. 6, 7, and 8 (left in FIG. 1), a distance of about 1/4" which will carry with it, most of the parts except the pilot head 106 that is spring pressed, together with compacter 24, toward body B, and the parts that are secured to said head. At the conclusion of this first 1/4" of travel, the clearance dog 107 through its engagement with the serrated bar 108, will have moved the latter to a stop position, which prevents the carriage slide 109 from moving downwardly any farther. Now, continued movements of the actuator yoke 105 will carry the mounting plate 110 with it and through the bar 111 and expanding dog 112 which is in engagement with another serrated bar 113, will pull the paired elements 104 downwardly with respect to the pilot head 106 and carriage slide 109 so that the inclined edges 103 of said elements 104 will bear against the rollers 102 on the inner ends of the carriages or expander arms 101, causing them to separate and, of course, spreading the wings 21 apart. This separating movement will continue for a predetermined distance as regulated by the distance that the expanding dog 112 is moved by its support bar 111.

The tension of the springs 114 forcing the rollers 102 against the inclined surfaces 103 of the elements 104 has a tendency to constantly urge the latter upwardly with respect to the pilot head 106 and carriage slide 109. However, this upward movement is resisted by the holding dog 115 in engagement with the serrated bar 113 and being carired by the bar 116 that is secured to the carriage slide 109 so that thereafter as the actuator yoke is moved upwardly, the assemblage of elements will be prevented from moving with respect to the pilot head 106 because of the holding dog 115 until the plate 110 contacts the slide 109. The upward movement of the actuator yoke 105 moves all of the mechanism except the pilot head 106 and parts attached thereto forward toward the body B until the wings 21 engage in the slots of said body. During such movement, the clearance bar 108 is pulled back to its original position by the return spring 117 and as the clearance dog 107 goes farther, it ratchets or clicks over the ridges on said bar 108 until it comes to rest at the proper distance to engage the bar in position for the next 1/4" clearance movement. Also, on such movement of the mounting plate 110, the expanding dog 112 through the arm 111 is clicking over the surface of the serrated bar 113 until the mounting plate 110 makes contact with the carriage slide 109. At this point, the expanding dog 112 is in position to activate the serrated bar 113 on the next movement back past clearance holding, at which position, the actuator 105 movement stops and the flyer arm 14 is activated and feeds wire over the wings 21 until a predetermined number of turns are wound. At this time the flyer arm 14 is stopped and the actuator yoke 105 pulls the universal winding head 20 back down the required 1/4" or other distance.

When the clearance dog 107 has pulled the clearance rack 108 to its stop and holds the carriage slide 109 in this position and the mounting plate 110 continues back until the expanding dog 112 through arm 111 has pulled the serrated bar 113, and also the elements 104, downwardly until the wings 21 are spread out far enough to engage the next pair of slots when brought forward. If this is the final coil or series of turns required in the pole of the stator or body B, the following action takes place as the actuator yoke 105 moves the mechanisms forward or upward to engage the wings 21 in the next slots.

The expanding dog 112 is tripped up from the serrated bar 111 by the trip 118 and is held in this position as by a ball detent in the expanding dog engaging in a recess in the bar 111. Also, the clearance dog 105 is tripped up from clearance rack 108 by trip 119 and held in this position by a ball detent in said clearance dog engaging in a recess machined in the bar 120. The holding dog 115 passes under trip 121 but is still engaged with the serrated bar 113.

The mounting plate 110 has a mechanical connection to the actuator yoke 105 and consequently moves therewith. The carriage slide 109 and all the mechanisms mounted in it are constantly urged rearward by expansion springs between carriage slide 109 and pilot head 106. The clearance rack 108 and clearance dog 107 hold the carriage slide 109 and pilot head 106 at predetermined distances apart, when the actuator yoke 105 goes back.

When the wings 21 are finally engaged in slots, the flyer arm 14 is energized and winds a predetermined number of turns in the slots of body B and then stops. The actuator yoke 105 then moves downward a predetermined distance taking mounting plate 110 with it because the expanding dog 112 and clearance dog 107 are tripped, the carriage slide 109 being urged downward in close contact with plate 110 by said springs. The holding dog 115, still engaged in the rack 113, holds the elements 104 in mechanical contact with the carriage slide 109 as it moves downwardly, and this, of course, through expanding arms or carriages 101 keeps the wings 21 fully expanded until the downward movement has reached a distance such that the wings 21 returning to their original position will clear all windings in the slots of the body B. At this point, the trip 121 releases the holding dog 115, the latter being held in tripped position by the aforesaid ball detent. This allows the springs 114 to urge the carriages 101 together, causing the cam elements 104 to move upward on the pilot head 106. On one cam 104 there are resets 122 and 123. Because the mounting plate 110 and carriage slide 109 are held solidly in the reset position, the bars 116 and 111 are held stationary, consequently the resets 122 and 123 move upward on said cam 104.

The reset expanding dog 112 and holding dog 115 are now engaged in the serrated bar 113, just prior to the clearance slide 109 coming to rest, a reset 124 mounted on the clearance rack support 125 resets clearance dog 107 to engage in the rack 108. The head 20 is now ready to resume its cycle.

*Operation*

Assuming that the apparatus has been adjusted to accommodate the body B in which wire coils are to be wound, the body B (clamped between the frusto-conical heads 26) is placed in vertical position and held securely by lowering the top arm 35 to engage the bosses of end pieces 37 and 38 in recesses in said heads. The end of the wire W which has been previously threaded through the drive shaft 10 and around the pulleys 16 on the winding or flyer arm 14, is then manually inserted into the first slot and the end is anchored as on a pin (not shown) projecting laterally from the rear side of the arm 35. This prevents the wire W from pulling out when the winding cycle is started.

The drive motor control switch 130 is then depressed and the tail stock advance switch 131 likewise is depressed. This energizes the solenoid air valve 132 to cause actuation of air cylinder 56 and consequent counter-clockwise rotation of the tail stock actuating lever 52. The tail stock 4 thus is advanced to the left. When the body B has been moved to make contact with the universal winding head wings 21, the switch 133 is closed energizing an air valve 134 to move piston rod 87 upwardly. The linear motion of said piston rod 87 imparts a rotary motion to the program drum 5 by means of the rack 87. Pinion 89 and ratchet 91 drive mounted on the drum shaft 90 which is predetermined and governed as by an adjusting screw on rack 87 and air valve 135. The lever 84 thereby swings clockwise by the cam groove 83 to advance the winding head 20 axially on the shaft 10 and placing it in proper position against the body B for winding the first coil. The air cylinder 136 immediately retracts upon contact of said adjusting screw of rack 87 with the mechanical air valve 135 and closes the switch 137 at the bottom of its stroke. The closing of said switch 137 will energize the air valve 138 advancing the piston in the air cylinder 76 which removes the brake and engages the clutch thereby allowing the drive motor to rotate the drive shaft 10 and flyer 14 so that wire W is wound into the pair of slots of body that are spanned by the wire guide wings 21 of the winding head 20. The revolutions of the drive shaft 10 will be counted by the counters 6, 7, 8, and 9 through chain drive 60 and 61 and when the drive shaft 10 has revolved the desired number of revolutions and reaches the predetermined number of the counter 6, a switch in the counter itself will close to energize the solenoid 74 whereby the brake is promptly applied, stopping the rotation of the drive shaft 10 and flyer arm 14 and disengaging the driving clutch to allow the drive motor to continue rotation together with the drive pulley 11. At the same time, an impulse is sent to the air valve 134 which will again advance the fluid motor 136 to rotate the program drum 5 and causing the winding head 20 to be actuated to spread apart the wings 21 for winding the second coil through the action of the lever 84 and cam track 83. The fluid motor piston 87 retracts again when striking mechanical air valve 135 and closes the switch 137 which will a second time energize the air valve 138 advancing the fluid motor 76, removing the brake and engaging the driving clutch causing the drive shaft 10 and flyer arm 14 to rotate to deposit wire into another pair of coil slots as determined by the span of the wire guide wings 21 in this new second position. The revolutions of shaft 10 are now registered on counter 7 and upon reaching a predetermined count, solenoid 74 is again energized. Also, another impulse is sent to the air valve 134 which advances the fluid motor 136 to rotate the program drum 5 causing lever 84 to oscillate in a counter clockwise direction. This action of the lever 84 retracts the winding head 20 to its original starting position. The air cylinder 136 will close the switch 139 upon retracting thereby energizing the air valve 132 retracting the piston in the air cylinder 56 which will oscillate the lever 52 clockwise thereby retracting the tail stock 4. When the tail stock 4 has retracted, a switch 140 is closed to energize the air valve 141 to advance the piston in the air cylinder 41 which will rotate the shaft 45 counter-clockwise as before described, thereby indexing the body B to the next pole through the bevel gears 46 and 47. The piston rod of cylinder 41 will close the switch 142 when retracting and energize the air valve 132 which will cause the piston in the air cylinder 56 to advance and once more the tail stock 4 is presented to the winding head 20 for the winding of the first coil of the next pole. A repetition of the previous action will then take place for complete winding of the second pole.

Other modes of applying the principle of the invention may be employed, change being made as regards the details described, provided the features stated in any of the following claims, or the equivalent of such, be employed.

What is claimed is:

1. A coil winding apparatus comprising a holder including opposite frusto-conical heads disposed adjacent the axial ends of an externally slotted body and adapted to clamp such body therebetween so as to expose a selected pair of axially extending slots for winding of a wire coil therein and across the axial ends of such body from one slot to the other, such pair of slots being spaced apart a relatively short distance such that wire pulled across the ends of said body from one slot to the other is pulled primarily against the sides of such slots; a winding head provided with converging wings that are adapted to be aligned with such selected pair of slots; a flyer arm rotatable about said winding head; means for feeding a wire under tension from said flyer arm whereby the wire, when secured at its end in fixed position relative to such body, slides along said wings and is guided thereby into the selected pair of slots when said wings are aligned therewith; a wire compacter on said winding head along which the wire slides inwardly toward such body as the wire is laid across the ends of such body whereby the wire is pulled toward the bottoms of such pair of slots; and means for so rotating said flyer arm, said compacter being provided with wire-contacting surfaces that are spaced axially from the respective ends of such body to cause the wire to be wound into a coil whose end portions are spaced axially from the respective ends of such body.

2. A coil winding apparatus comprising a holder including heads disposed adjacent the ends of an externally slotted body and adapted to clamp such body therebetween so as to expose at least two pairs of slots for winding of wire coils in the respective pairs and across the ends of such body from one slot to the other of each pair, a first pair of slots being spaced apart a relatively shorter distance than a second pair of slots; a winding head provided with converging wings that are adapted to be first aligned with said first pair of slots and then with said second pair of slots; means for moving said wings from alignment with said first pair of slots to alignment with said second pair of slots; a flyer arm rotatable about said winding head; means for feeding wire under tension from said flyer arm whereby the wire, when secured at its end in fixed position relative to such body, slides along said wings and is guided thereby first into said first pair of slots and across the ends of such body and thence into said second pair of slots and across the ends of such body; and means for so rotating said flyer arm.

3. The coil winding apparatus of claim 2 wherein said holding heads are frusto-conical and wherein the slots of said second pair of slots are spaced apart a distance such that wire pulled across the ends of said body from one slot to the other is pulled primarily against the sides of such slot.

4. The coil winding apparatus of claim 2 wherein the slots of said first pair of slots are spaced a distance such that wire pulled across the ends of such body from one slot to the other is pulled primarily against the sides of such slots, and wherein said winding head is provided with a wire compacter along which the wire slides inwardly toward such body as the wire is laid across the ends of such body whereby the wire is pulled toward the bottoms of said first pair of slots.

5. The coil winding apparatus of claim 4 wherein said wire compacter has wire contacting surfaces that are spaced axially from the respective ends of such body to cause the wire to be wound into a coil whose end portions are spaced axially from the respective ends of such body.

6. The coil winding apparatus of claim 4 wherein said holding heads are frusto-conical and wherein the slots of said second pair of slots are spaced apart a distance such that wire pulled across the ends of said body from one slot to the other is pulled primarily against the sides of such slot.

References Cited in the file of this patent

UNITED STATES PATENTS

| | | |
|---|---|---|
| 882,253 | Kunkel | Mar. 17, 1908 |
| 1,121,798 | Chapman | Dec. 22, 1914 |
| 1,503,254 | Sippel et al. | July 29, 1924 |
| 2,284,115 | Wirth | May 26, 1942 |
| 2,627,379 | Moore | Feb. 3, 1953 |